(12) United States Patent
Wei et al.

(10) Patent No.: US 8,339,820 B2
(45) Date of Patent: Dec. 25, 2012

(54) THIRTY-SIX PULSE POWER TRANSFORMER AND POWER CONVERTER INCORPORATING SAME

(75) Inventors: Lixiang Wei, Whitefish Bay, WI (US); Gary L. Skibinski, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 246 days.

(21) Appl. No.: 12/612,562

(22) Filed: Nov. 4, 2009

(65) Prior Publication Data
US 2011/0103096 A1    May 5, 2011

(51) Int. Cl.
*H02M 7/08* (2006.01)
*H02M 7/06* (2006.01)
*H02M 5/40* (2006.01)
*H02M 7/00* (2006.01)

(52) U.S. Cl. ............... 363/69; 363/3; 363/5; 363/34; 363/64

(58) Field of Classification Search ............... 363/3, 5, 363/64, 125, 148, 153, 154, 171, 34, 69; 323/361
See application file for complete search history.

(56) References Cited

U.S. PATENT DOCUMENTS

| | | | |
|---|---|---|---|
| 4,876,634 A * | 10/1989 | Paice | ............... 363/5 |
| 5,148,357 A * | 9/1992 | Paice | ............... 363/5 |
| 6,169,674 B1 * | 1/2001 | Owen | ............... 363/64 |
| 6,198,647 B1 | 3/2001 | Zhou et al. | |
| 6,249,443 B1 | 6/2001 | Zhou et al. | |
| 6,335,872 B1 * | 1/2002 | Zhou et al. | ............... 363/154 |
| 6,424,552 B1 | 7/2002 | Jacobson | |
| 6,950,322 B2 | 9/2005 | Ferens | |
| 6,982,884 B1 * | 1/2006 | Paice | ............... 363/44 |
| 7,095,636 B2 | 8/2006 | Sarlioglu | |
| 7,233,506 B1 * | 6/2007 | Paice | ............... 363/45 |

(Continued)

FOREIGN PATENT DOCUMENTS

DE    3826524    3/1989

(Continued)

OTHER PUBLICATIONS

Skibinski et al.; "Cost effective multi-pulse transformer solutions for harmonic mitigation in AC drives," IEEE, vol. 3, pp. 1488-1497, IEEE 38th IAS Annual Meeting, Oct. 12-16, 2003.

(Continued)

*Primary Examiner* — Gary L Laxton
*Assistant Examiner* — Zekre Tsehaye
(74) *Attorney, Agent, or Firm* — Fletcher Yoder, P.C.; Alexander R. Kuszewski; John M. Miller (57) ABSTRACT

Embodiments of the present invention provide novel techniques for using multiple 18-pulse rectifier circuits in parallel. In particular, each rectifier circuit may include an autotransformer having 15 inductors coupled in series, joined by 15 nodes interposed between pairs of the inductors. The inductors may be represented as a hexagon in which alternating sides of the hexagon have two and three inductors, respectively. Each rectifier circuit may also include three inputs for three-phase AC power coupled to alternating vertices of the hexagonal representation and nine outputs for AC power coupled between each node that is not a vertex of the hexagonal representation and a respective diode bridge. Outputs of the diode bridges for the rectifier circuits may be coupled to a DC bus. In addition, a means for reducing circulating current between the parallel rectifier circuits and for promoting load sharing between the parallel rectifier circuits is also provided.

20 Claims, 10 Drawing Sheets

U.S. PATENT DOCUMENTS 7,352,594 B2     4/2008  Cester
7,852,643 B2 *  12/2010  Zhang et al. .................... 363/65

FOREIGN PATENT DOCUMENTS

| EP | 1528660 | 5/2005 |
|---|---|---|
| JP | 10323045 | 12/1998 |
| WO | 2005119892 | 12/2005 |

OTHER PUBLICATIONS

Singh et al.; "Multipulse AC-DC Converters for Improving Power Quality: a Review," IEEE Transactions on Power Electronics, vol. 23, No. 1, Jan. 2008; pp. 260-281.

Extended European Search Report for related European Application No. 10189990.4 dated Feb. 28, 2011, 9 pgs.

Skibinski, G. L. et al.; "Cost Effective Multi—Pulse Transformer Solutions for Harmonic Mitigation in AC Drives"; IEEE 2003 Industry Application Society (IAS) Conference; Oct. 12-16, 2003; vol. 3, pp. 1488-1497.

Wei, Lixiang et al.; "Power Transformer and Power Converter Incorporating Same"; U.S. Appl. No. 12/612,544, filed Nov. 4, 2009.

Skibinski et al.; "Cost Effective Multi—Pulse Transformer Solutions for Harmonic Mitigation in AC Drives"; IEEE 2003 Industry Application Society (IAS) Conference; Oct. 12-16, 2003; vol. 3, pp. 1488-1497.

* cited by examiner

THIRTY-SIX PULSE POWER TRANSFORMER AND POWER CONVERTER INCORPORATING SAME

BACKGROUND

The present invention relates generally to the field of power electronic devices such as those used in power conversion or application of power to motors and similar loads. More particularly, the present invention relates to systems and methods for using multiple 18-pulse rectifier circuits in parallel to increase the overall rating of a motor drive while reducing the input current harmonics.

Power electronic devices and modules are used in a wide range of applications. For example, electric motor controllers, rectifiers, inverters, and more generally, power converters are employed to condition incoming power and supply power to devices, such as a drive motor. However, the power and signals transmitted within the electronic devices often contain undesirable characteristics that may require additional devices to reduce or filter the signals. For instance, in alternating current (AC) motor controllers, a rectifier may be used to covert the AC power to stable direct current (DC) power, and an inverter circuit may be used to convert the stable DC power back to the AC power supplied to the motor. However, rectifiers may be susceptible to AC input current harmonics and DC bus ripple, among other things.

BRIEF DESCRIPTION

Embodiments of the present invention provide novel techniques for using multiple 18-pulse rectifier circuits in parallel. In particular, each rectifier circuit may include an autotransformer having 15 inductors coupled in series, joined by 15 nodes interposed between pairs of the inductors. The inductors may be represented as a hexagon in which alternating sides of the hexagon have two and three inductors, respectively. Each rectifier circuit may also include three inputs for three-phase AC power coupled to alternating vertices of the hexagonal representation and nine outputs for AC power coupled between each node that is not a vertex of the hexagonal representation and a respective diode bridge. Outputs of the diode bridges for the rectifier circuits may be coupled to a DC bus.

In addition, a means for reducing circulating current between the parallel rectifier circuits and for promoting load sharing between the parallel rectifier circuits is also provided. For example, in certain embodiments, AC line reactors coupled to inputs of each of the rectifiers may be used. In other embodiments, choke inductors coupled between each output of the diode bridges of the rectifier circuits and the DC bus may be used. Furthermore, in yet other embodiments, choke inductors coupled to the DC bus may be used.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Rectifiers are generally used to rectify AC voltages and generate DC voltages across DC buses. A typical rectifier includes a switch-based bridge including two switches for each AC voltage phase which are each linked to the DC buses. The switches are alternately opened and closed in a timed fashion that, as the name implies, causes rectification of the AC voltage. When designing a rectifier configuration, there are three main considerations including cost, AC input current harmonics, and DC bus ripple. With respect to AC input current harmonics, when an AC phase is linked to a rectifier and rectifier switches are switched, the switching action is known to cause harmonics on the AC lines. AC line harmonics caused by one rectifier may distort the AC voltages provided to other commonly-linked loads and, therefore, should generally be limited. Rectifier switching also typically generates ripple on the DC bus. As with most hardware-intensive configurations, cost can be minimized by using a reduced number of system components and using relatively inexpensive components where possible.

AC input current harmonics and DC ripple may be improved by increasing the number of AC phases that are rectified by the rectifier. More specifically, these AC phases may be phase-shifted from each other. For example, by rectifying nine-phase AC current instead of three-phase AC current, harmonics and ripple may be substantially reduced. Where AC harmonic restrictions are placed on rectifier systems, such restrictions may be satisfied by employing an 18-pulse rectifier that uses a nine-phase source of AC power. As the global standard for AC power distribution is three-phase, 18-pulse rectifiers may use three-to-nine phase power converters between utility supply lines and rectifier switches.

Figure 1:
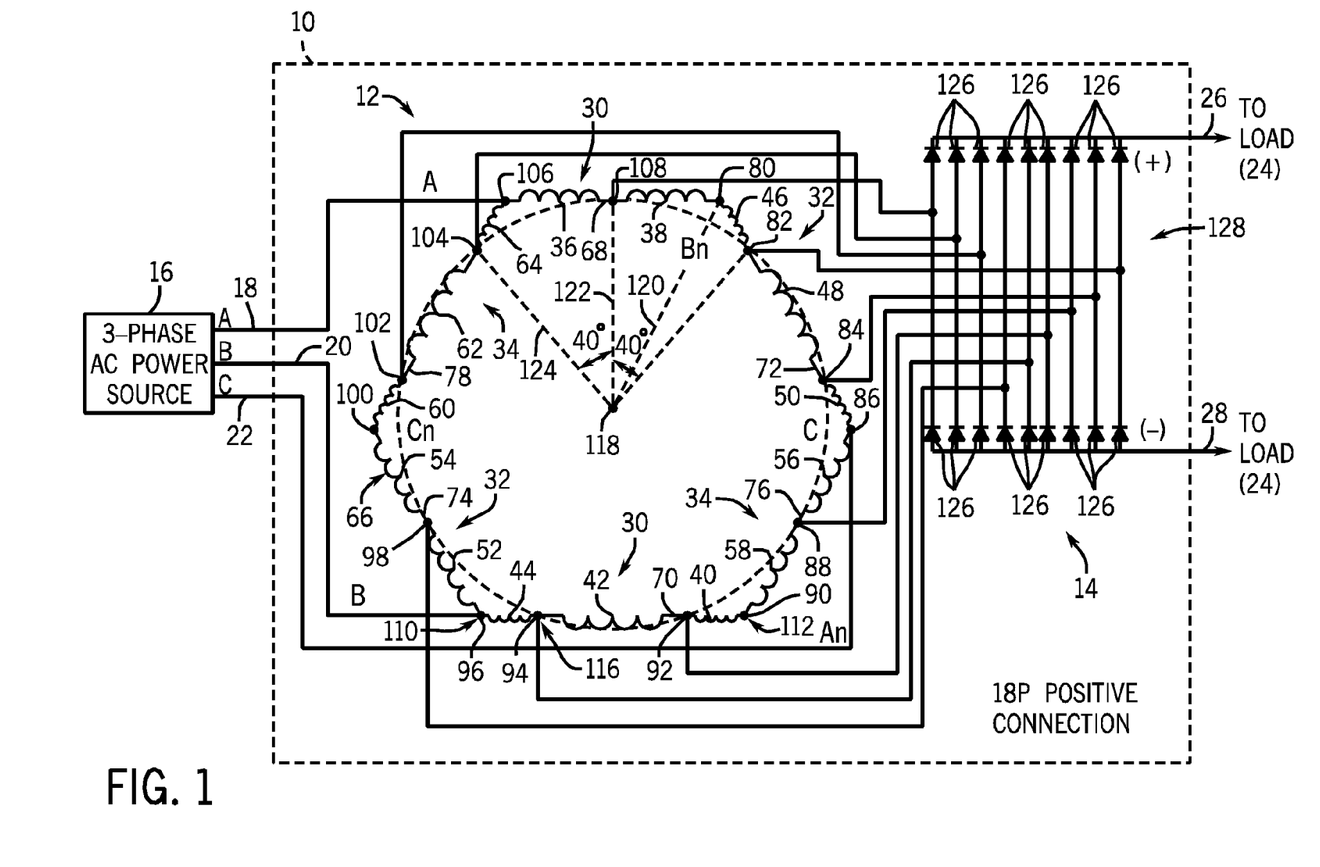
FIG. 1 is a schematic diagram of an exemplary embodiment of an 18-pulse positive building block, including a nine-phase, 18-pulse autotransformer and associated nine-phase rectifier.

Turning now to the drawings, and referring first to FIG. 1, an exemplary embodiment of an 18-pulse positive building block 10 is illustrated. The 18-pulse positive building block 10 includes a nine-phase, 18-pulse autotransformer 12 and associated nine-phase rectifier 14. The 18-pulse positive building block 10 is connected to a three-phase AC power source 16 via three inputs lines 18, 20, 22 and may be connected to a load 24 via two DC output lines 26, 28. In general, in the 18-pulse positive building block 10, the three input lines 18, 20, 22 connect to the autotransformer 12 and the two output lines 26, 28 connect to the rectifier 14, as described in greater detail below. The three input lines 18, 20, 22 from the three-phase AC power source 16 may correspond to the three phases, respectively, which may generally be referred to as phases A, B, and C. In addition, the two output lines 26, 28 to the load 24 may include a positive DC output line 26 and a negative DC output line 28.

The autotransformer 12 may include three coils 30, 32, 34 with each coil including a plurality of inductors. In particular, a first coil 30 includes inductors 36, 38, 40, 42, 44, a second coil 32 includes inductors 46, 48, 50, 52, 54, and a third coil 34 includes inductors 56, 58, 60, 62, 64. For simplicity, the inductors 36, 38, 40, 42, 44, 46, 48, 50, 52, 54, 56, 58, 60, 62, 64 may be referred to collectively as the inductors 66. The inductors 66 are connected in series and may generally be represented in the form of a hexagon. More specifically, as illustrated, the plurality of inductors 66 may be located on six sides 68, 70, 72, 74, 76, 78 of the hexagonal shape. The six sides 68, 70, 72, 74, 76, 78 of the hexagon alternate between having two and three inductors 66. In general, the inductors 66 for a specific coil may be located on opposed sides of the hexagon. For instance, inductors 36 and 38 of the first coil 30 may be on opposite sides (e.g., sides 68 and 70) of the hexagon from inductors 40, 42, and 44 of the first coil 30, inductors 46, 48, and 50 of the second coil 32 may be on opposite sides (e.g., sides 72 and 74) of the hexagon from inductors 52 and 54 of the second coil 32, and inductors 56 and 58 of the third coil 34 may be on opposite sides (e.g., sides 76 and 78) of the hexagon from inductors 60, 62, and 64 of the third coil 34.

As illustrated, fifteen nodes are formed at points between adjacent inductors 66. These nodes may include nodes 80, 82, 84, 86, 88, 90, 92, 94, 96, 98, 100, 102, 104, 106, and 108 and may be collectively referred to as the nodes 110. Six of the fifteen nodes 110 are input nodes. In particular, the input nodes may include nodes 80, 86, 90, 96, 100, and 106 and may be collectively referred to as the input nodes 112. More specifically, the input nodes 112 are located at nodes which are vertices of the hexagonal representation of the autotransformer 12. Three of the six inputs nodes 112 may be connected to the three-phase AC power source 16. In particular, non-consecutive input nodes 112 may be connected to the three-phase AC power source 16.

Figure 2:
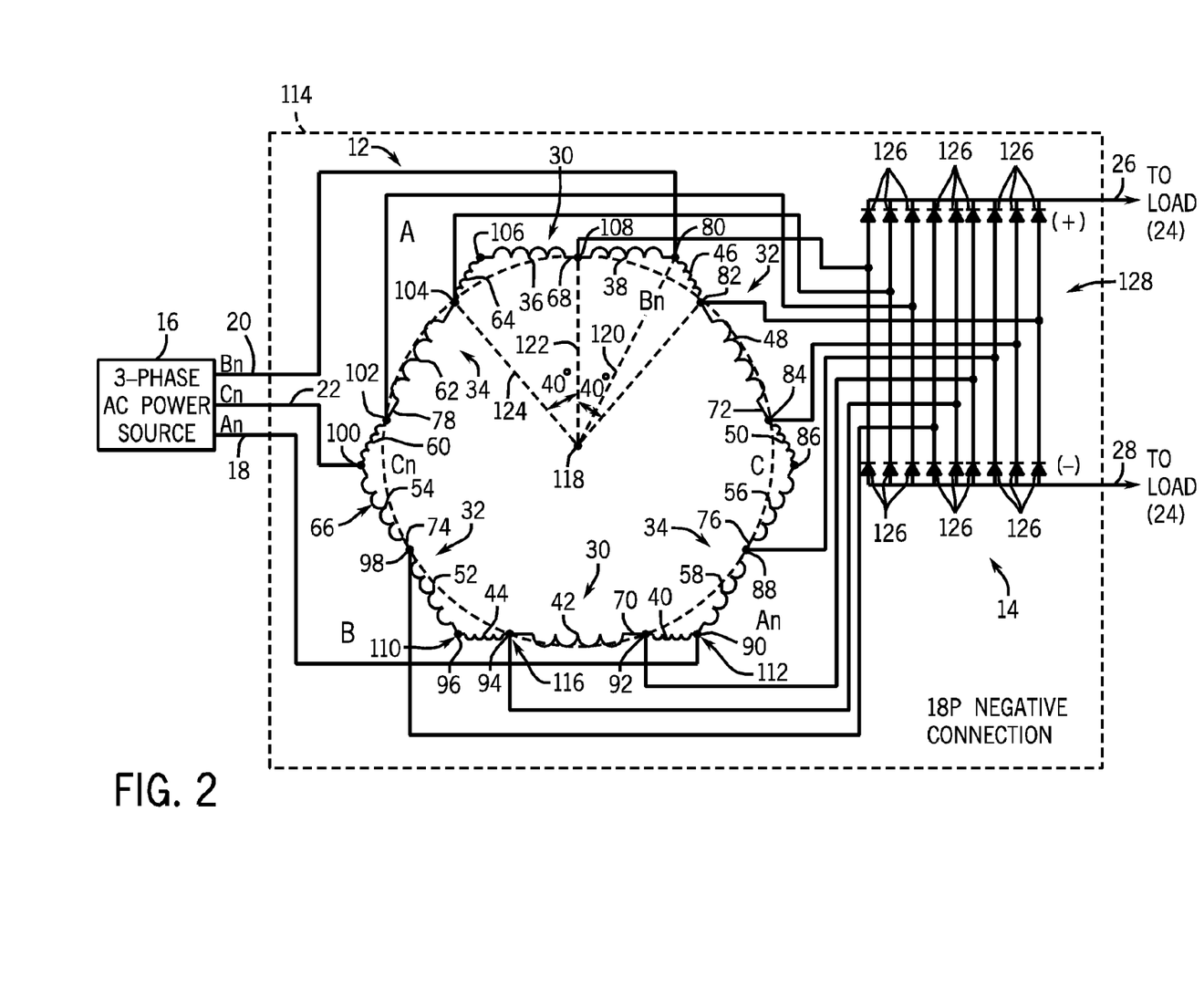
FIG. 2 is a schematic diagram of an exemplary embodiment of an 18-pulse negative building block, including a nine-phase, 18-pulse autotransformer and associated nine-phase rectifier.

The autotransformer 12 used with the 18-pulse positive building block 10 has a certain set of input nodes 112. In particular, in the 18-pulse positive building block 10, the input nodes 112 are nodes 106, 96, and 86, each of which are separated by 120 degrees of phase shift. More specifically, input nodes 106, 96, and 86 may be connected to the three-phase AC power source 16 via input lines 18, 20, and 22, respectively, as represented by phases A, B, and C. Conversely, as illustrated in FIG. 2, the autotransformer 12 used with the 18-pulse negative building block 114 has a different set of input nodes 112. In particular, in the 18-pulse negative building block 114, the input nodes 112 are nodes 90, 80, and 100, each of which are also separated by 120 degrees of phase shift. More specifically, input nodes 90, 80, and 100 may be connected to the three-phase AC power source 16 via input lines 18, 20, and 22, respectively, as represented by phases $A_n$, $B_n$, and $C_n$. In other words, the input lines 18, 20, 22 are coupled to alternating vertices of the hexagonal representation of both the 18-pulse positive building block 10 of FIG. 1 and the 18-pulse negative building block 114 of FIG. 2. Both the 18-pulse positive building block 10 of FIG. 1 and the 18-pulse negative building block 114 of FIG. 2 may be referred to as rectifier circuits.

In addition, nine of the fifteen nodes 110 are output nodes. In particular, the output nodes may include nodes 82, 84, 88, 92, 94, 98, 102, 104, and 108 and may be collectively referred to as the output nodes 116. More specifically, the output nodes 116 are located at nodes which are not vertices of the hexagonal representation of the autotransformer 12. The nine output nodes 116 may be connected to the rectifier 14 which, in turn, may be connected to the load 24 (e.g., through at least one DC bus and at least one inverter circuit).

The hexagonal representation of the autotransformer 12 may be thought of as a voltage plane wherein the distance between the each respective node 110 and an origin point 118 represents the voltage magnitude at the corresponding node 110. For example, a vector 120 formed between the origin point 118 and node 80 represents the voltage magnitude at node 80. A slightly shorter vector 122 formed between the origin point 118 and node 108 represents the voltage magnitude at node 108. Therefore, the voltage magnitude at node 80 is greater than the voltage magnitude at node 108. The angle between two vectors (e.g., vectors 120 and 122) represents a phase shift angle between two node voltages. The phase shift angle between each two adjacent output node voltages is essentially 40 degrees. For example, as illustrated, the phase shift angle between nodes 108 and 82 is 40 degrees. Similarly, the voltage magnitude vectors at each output node 116 are identical. For example, as illustrated, vectors 122 and 124, relating to output nodes 108 and 104, respectively, are identical.

For either the 18-pulse positive building block 10 or the 18-pulse negative building block 114, the voltage magnitude vectors for the input nodes 112 are longer than the voltage magnitude vectors for the output nodes 116. Therefore, the resulting voltage output is stepped down using the autotransformer 12 illustrated in FIGS. 1 and 2. In addition, similar to the output nodes 116, the voltage magnitude vectors are identical for each input node 112. The step down voltage magnitude for the autotransformer 12 between the primary (i.e., input) and secondary (i.e., output) voltages is proportional to the ratio of the lengths of the voltage magnitude vectors of the input and output nodes 112 and 116. For example, the step down voltage magnitude will be proportional to the length of vector 122 (i.e., the length of the output vectors) to the length of vector 120 (i.e., the length of the input vectors). The following equations represent the trigonometric relationship between these two magnitudes:

$$\theta = \tan^{-1}\left(\frac{\cos(20°)(1-\cos(40°))}{\sin(20°)+\cos(20°)\sin(40°)}\right) = 13.08°$$

-continued $$\frac{V_{secondary}}{V_{primary}} = \frac{122}{120} = \cos(40° - \theta) \sim 0.8916$$

Therefore, for the autotransformer 12 illustrated in FIGS. 1 and 2, the voltage step down is approximately 10.84%. However, it should be noted that different topologies of the hexagonal shape of the autotransformer 12 may lead to varying degrees of stepped down voltages. In fact, certain topologies may even lead to unity gain. For example, U.S. Pat. Nos. 6,198,647, 6,249,443, and 6,335,872, each of which are hereby incorporated by reference in their entirety, illustrate such various topologies. Indeed, the disclosed embodiments may be used with any kind of autotransformer.

As described above, the autotransformer 12 is capable of transforming three-phase AC input voltages to nine-phase AC output voltages using three coils 30, 32, 34, each coil forming a plurality of series inductors 66 arranged to form a hexagon. Nodes 110 between the inductors 66 form nine output nodes 116. The inductors 66 are sized and configured such that the voltage magnitudes at the output nodes 116 are identical, adjacent output nodes 116 are separated by 40-degree phase shifts, and the input nodes 112 are 120 degrees out of phase. Downstream of the autotransformer 12, the nine output nodes 116 may be connected to the nine-phase rectifier 14. In certain embodiments, the nine-phase rectifier 14 may include nine pairs of rectifier diodes 126 with each pair of rectifier diodes 126 forming a diode bridge 128. The nine-phase rectifier 14 converts the nine-phase AC input into a DC output, which may be directed through a DC bus, for ultimate use by the load 24, as described in greater detail below.

One way to maximize the overall rating of a drive without designing larger transformers and rectifier circuits is to use the 18-pulse positive building block 10 of FIG. 1, the 18-pulse negative building block 114 of FIG. 2, or combinations of both in parallel. Using these building blocks 10, 114 in parallel may not only increase the overall rating of the drive, but may also further reduce AC input current harmonics by providing pseudo 36-pulse input line harmonics. However, using these building blocks 10, 114 in parallel also may generally increase the possibility of looping and current sharing between the parallel building blocks 10, 114.

Figure 3:
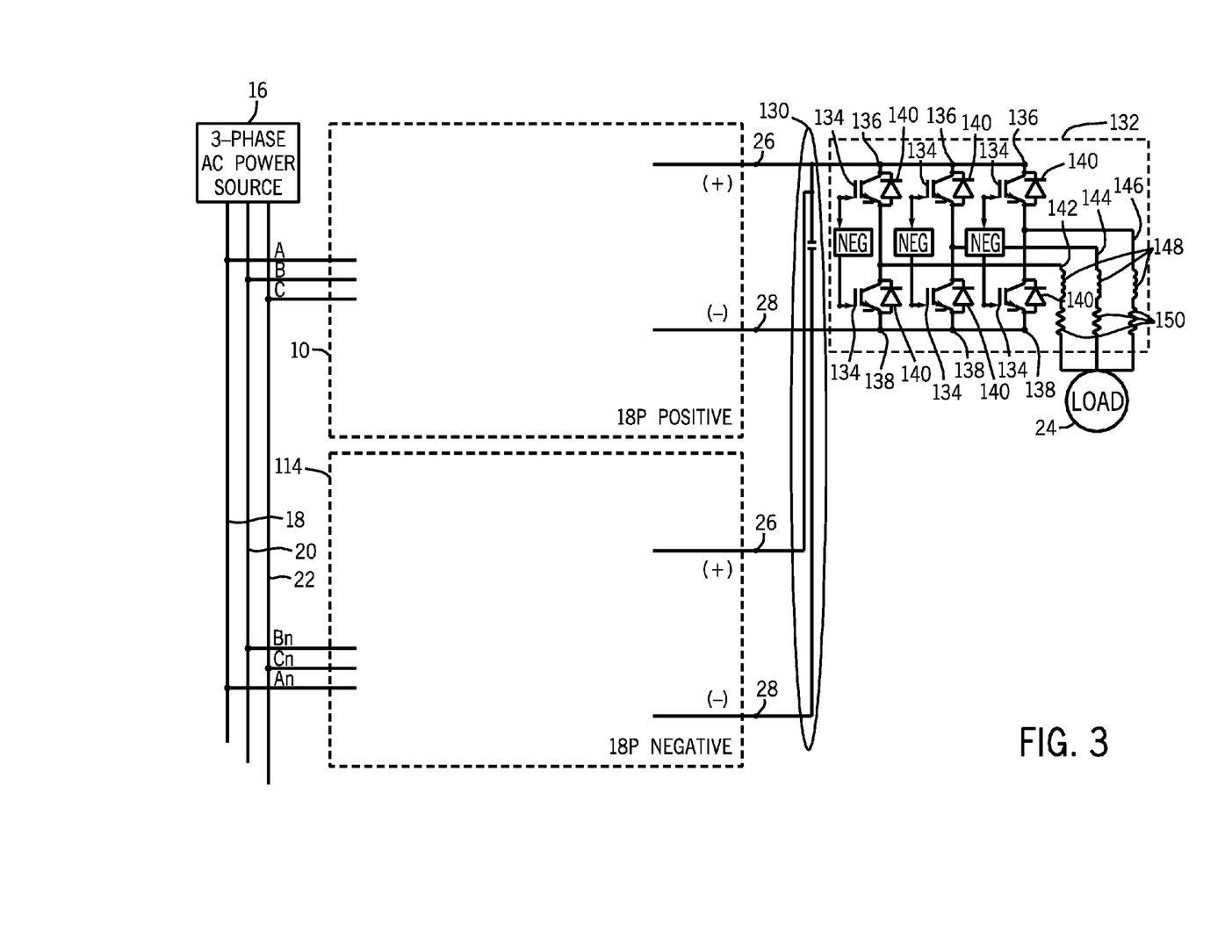
FIG. 3 is a schematic diagram of an exemplary embodiment of the 18-pulse positive building block of FIG. 1 in parallel with the 18-pulse negative building block of FIG. 2.

One approach for reducing looping and current sharing between parallel building blocks 10, 114 is to connect inputs of the building blocks 10, 114 in an opposite manner. For example, FIG. 3 is a schematic diagram of an exemplary embodiment of the 18-pulse positive building block 10 of FIG. 1 in parallel with the 18-pulse negative building block 114 of FIG. 2. As discussed above and as illustrated in FIG. 3, both the 18-pulse positive building block 10 and the 18-pulse negative building block 114 may be connected to the three-phase AC power source 16. However, input lines 18, 20, and 22 from the three-phase AC power source 16 may be connected to the 18-pulse positive building block 10 as described above with respect to FIG. 1 while input lines 18, 20, and 22 from the three-phase AC power source 16 may be connected to the 18-pulse negative building block 114 as described above with respect to FIG. 2. More specifically, input lines 18, 20, and 22 may be connected to input nodes 106, 96, and 86 of the 18-pulse positive building block 10 as phases A, B, and C, respectively, whereas input lines 18, 20, and 22 may be connected to input nodes 90, 80, and 100 of the 18-pulse negative building block 114 as phases $A_n$, $B_n$, and $C_n$, respectively.

Therefore, the like autotransformers 12 of the 18-pulse positive building block 10 and the 18-pulse negative building block 114 may be connected to the input lines 18, 20, 22 from the three-phase AC power source 16 through input nodes 112 that are 180 degrees out of phase. Since the 18-pulse positive building block 10 and 18-pulse negative building block 114 are coupled to the three-phase AC power source 16 in a manner which is 180 degrees out of phase with each other, the possibility of looping and current sharing between the parallel building blocks 10, 114 may be substantially reduced. In addition, the AC input current harmonics and DC bus ripple may also be substantially reduced. More specifically, by connecting the 18-pulse positive building block 10 and the 18-pulse negative building block 114 in parallel such that the input lines 18, 20, 22 from the three-phase AC power source 16 are 180 degrees out of phase, the building blocks 10, 114 experience input currents which directly offset each other at any given point in time. In other words, phase A generally offsets phase $A_n$, phase B generally offsets phase $B_n$, and phase C generally offsets phase $C_n$. As such, looping and current sharing between the building blocks 10, 14 may be reduced. In general, this method of using the 18-pulse positive building block 10 and the 18-pulse negative building block 114 in parallel is particularly effective when the two building blocks 10, 114 are used in matching pairs.

Downstream of the 18-pulse positive building block 10 and the 18-pulse negative building block 114, the positive and negative DC output lines 26, 28 may be connected to the load 24 via a DC bus 130 and an inverter circuit 132. In general, the DC output from the 18-pulse positive building block 10 and the 18-pulse negative building block 114 may be converted back into an AC output by the inverter circuit 132, which may then be used to drive the load 24. In addition, as described in greater detail below, in certain embodiments, multiple inverter circuits 132 may be connected to the DC bus 130 and the load 24. In particular, in certain embodiments, both the 18-pulse positive building block 10 and the 18-pulse negative building block 114 may be associated with a respective inverter circuit 132.

As illustrated, the exemplary inverter circuit 132 includes a plurality of switches 134, such as insulated gate bipolar junction transistors (IGBTs). Specifically, two switches 134 may be coupled in series between a positive side 136 and a negative side 138. Each switch 134 may be paired with a diode 140. The inverter circuit 132 may also include three output terminals 142, 144, 146, which may be coupled to one of the switch outputs between one of the pairs of switches 134. The output terminals 142, 144, 146 may be directly connected to the load 24. In certain embodiments, each of the output terminals 142, 144, 146 may include inductors 148 and/or resistors 150. Furthermore, driver circuitry may be coupled to each of the switches 134 to create a three-phase output waveform for the load 24. For example, the desired output waveform may be generated through pulse width modulation, wherein the drive circuitry causes the switches 134 to switch rapidly on and off in a particular sequence, thus creating an approximately sinusoidal output waveform. As such, the inverter circuit 132 may be capable of converting the DC power from the DC bus 130 to controllable frequency output power for the load 24.

Figure 4:
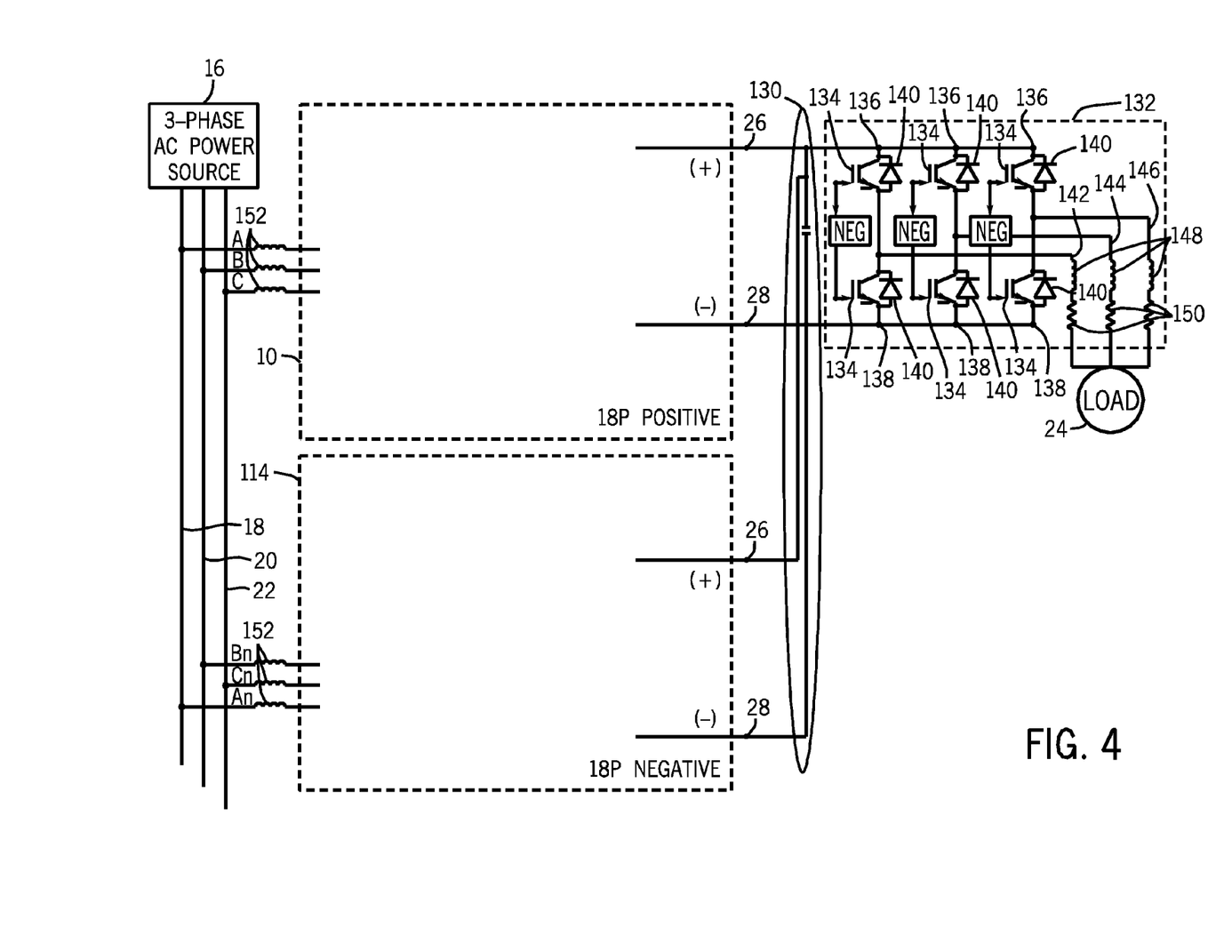
FIG. 4 is a schematic diagram of an exemplary embodiment of the 18-pulse positive building block of FIG. 1 in parallel with the 18-pulse negative building block of FIG. 2, having AC line reactors coupled to each of the input lines upstream of the parallel building blocks.

Therefore, FIG. 3 illustrates an exemplary embodiment where the 18-pulse positive building block 10 and the 18-pulse negative building block 114 may be used in parallel to reduce AC input current harmonics and DC bus ripple while also reducing the possibility of looping and current sharing between the two parallel building blocks 10, 114. However, even further techniques may be utilized to reduce the possibility of looping and current sharing. For example, FIG. 4 is a schematic diagram of an exemplary embodiment of the 18-pulse positive building block 10 of FIG. 1 in parallel with the 18-pulse negative building block 114 of FIG. 2, having AC line reactors 152 coupled to each of the input lines 18, 20, and 22 upstream of the parallel building blocks 10, 114. More specifically, as illustrated in FIG. 4, both the 18-pulse positive building block 10 and the 18-pulse negative building block 114 are associated with three AC line reactors 152 corresponding to each of the input lines 18, 20, and 22 from the three-phase AC power source 16.

The AC line reactors 152 may essentially be inductors. More specifically, they are coils of wire which allow a magnetic field to form around the coil when current flows through it. When energized, the AC line reactors 152 act as an electric magnet with the strength of the field being proportional to the current flowing through the AC line reactors 152 and the number of winding turns. As such, more winding turns yield higher inductance ratings for the AC line reactors 152. In certain embodiments, the AC line reactors 152 may comprise a lamination material (e.g., iron) as a core to the winding, which may concentrate the lines of magnetic flux and enhance the inductance of the AC line reactors 152. A main property of the AC line reactors 152 are their inductance, which may be measured in henrys, millihenrys, or microhenrys.

In a DC circuit (e.g., the DC bus 130), the AC line reactors 152 may simply limit the rate of change of current in the circuit since the current tends to continue flowing at a given rate for any given time. In other words, an increase or decrease in applied voltage may result in a slow increase or decrease in current. This helps to reduce the $17^{th}$ and $19^{th}$ order harmonics inherent with the 18-pulse transformer. Moreover, it also helps to mitigate the harmonics component of the line current generated by source harmonics and voltage unbalances. Conversely, if the rate of current in the AC line reactor 152 changes, a corresponding voltage will be induced. This induced voltage may generally be opposite in polarity and proportional to both the rate of change of current and inductance of the AC line reactor 152.

The reactance of the AC line reactors 152 is part of the total impedance for an AC circuit. The inductive reactance (e.g., measured in ohms) of a given AC line reactor 152 is equal to two times the applied frequency of the AC source times the inductance value of the AC line reactor 152. The inductive reactance and, therefore, the impendence of a given AC line reactor 152 is higher with higher inductance values. In addition, a given AC line reactor 152 will have a higher impedance at higher frequencies of the AC source. Therefore, AC line reactors 152 both limit the rate of rise in current and add impedance to an AC circuit proportional to both the inductance of the AC line reactor 152 and the applied frequency.

The AC line reactors 152 may reduce and broaden out the peaks of the three-phase AC power source 16. This may have the effect of making the current somewhat more sinusoidal, lowering the harmonic level significantly (e.g., up to approximately 35% for a 6-pulse rectifier). In addition, the AC line reactors 152 may reduce DC ripple as well as reducing the possibility of looping and current sharing between the 18-pulse positive building block 10 and the 18-pulse negative building block 114. The size of the AC line reactors 152 may vary between drives. In general, the cumulative impedance value of the AC line reactors 152 may generally fall between 1.5% and 15% of the impedance of the drive at full load. In other words, the AC line reactors 152 may be selected such that the AC line reactors drop 1.5% to 15% of the applied voltage at full rated current.

Figure 5:
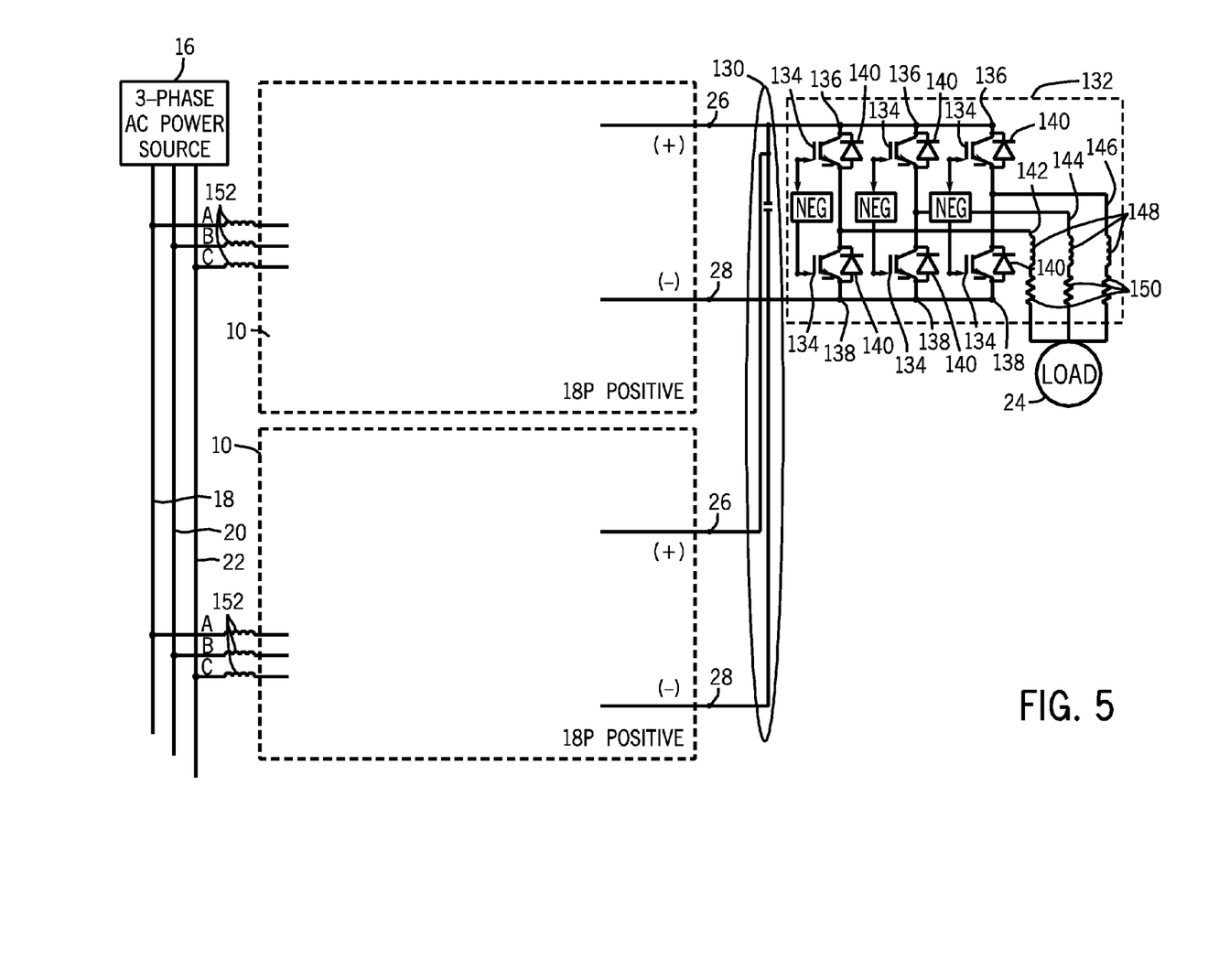
FIG. 5 is a schematic diagram of two exemplary embodiments of the 18-pulse positive building block of FIG. 1 in parallel with each other, having AC line reactors coupled to each of the input lines upstream of the parallel building blocks.

Although illustrated in FIG. 4 as being used upstream of the 18-pulse positive building block 10 and the 18-pulse negative building block 114 in parallel, the AC line reactors 152 may also prove useful in other configurations. For example, FIG. 5 is a schematic diagram of two exemplary embodiments of the 18-pulse positive building block 10 of FIG. 1 in parallel with each other, having AC line reactors 152 coupled to each of the input lines 18, 20, and 22 upstream of the parallel building blocks 10. More specifically, as illustrated in FIG. 5, both of the 18-pulse positive building blocks 10 are associated with three AC line reactors 152 corresponding to each of the input lines 18, 20, and 22 from the three-phase AC power source 16. In the same manner as described above with respect to FIG. 4, the AC line reactors 152 may help reduce the possibility of looping and current sharing between the two 18-pulse positive building blocks 10. In other embodiments, two 18-pulse negative building blocks 114 may also be used together in parallel, having AC line reactors 152 coupled to each of the input lines 18, 20, and 22 upstream of the parallel building blocks 114. Furthermore, in certain embodiments, more than two of either the 18-pulse positive building blocks 10 or the 18-pulse negative building blocks 114 may be used in parallel. Indeed, different numbers and combinations of the 18-pulse positive building blocks 10 and the 18-pulse negative building blocks 114 may be used together in parallel. In all of these embodiments, the AC line reactors 152 may help reduce the possibility of looping and current sharing between the parallel building blocks 10, 114.

Figure 6:
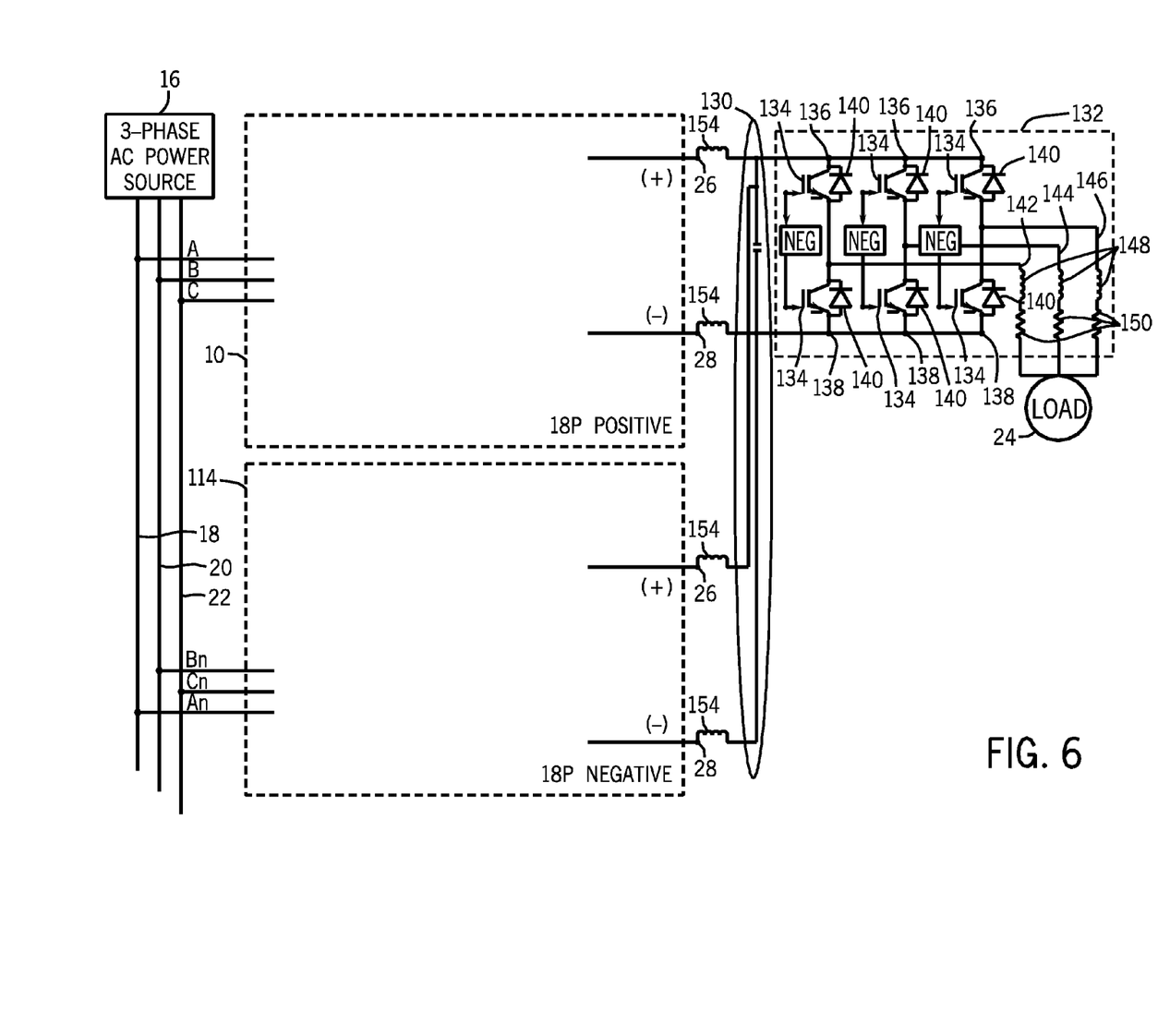
FIG. 6 is a schematic diagram of an exemplary embodiment of the 18-pulse positive building block of FIG. 1 in parallel with the 18-pulse negative building block of FIG. 2, having choke inductors coupled between each of the outputs downstream of the parallel building blocks and a DC bus.

However, using AC line reactors 152 upstream of the parallel building blocks 10, 144 is not the only technique for reducing the possibility of looping and current sharing. For example, FIG. 6 is a schematic diagram of an exemplary embodiment of the 18-pulse positive building block 10 of FIG. 1 in parallel with the 18-pulse negative building block 114 of FIG. 2, having choke inductors 154 coupled between each of the outputs 26, 28 downstream of the parallel building blocks 10, 114 and the DC bus 130. More specifically, as illustrated in FIG. 6, both the 18-pulse positive building block 10 and the 18-pulse negative building block 114 are associated with choke inductors 154 corresponding to each of the output lines 26, 28 which are connected to the DC bus 130. As with the AC line reactors 152, the choke inductors 154 may also generally be capable of reducing the possibility of looping and current sharing between the 18-pulse positive building block 10 and the 18-pulse negative building block 114. This helps to reduce the $17^{th}$ and $19^{th}$ order harmonics inherent with the 18-pulse transformer. Moreover, it also helps to mitigate the harmonics component of the line current generated by source harmonics and voltage unbalances.

Figure 7:
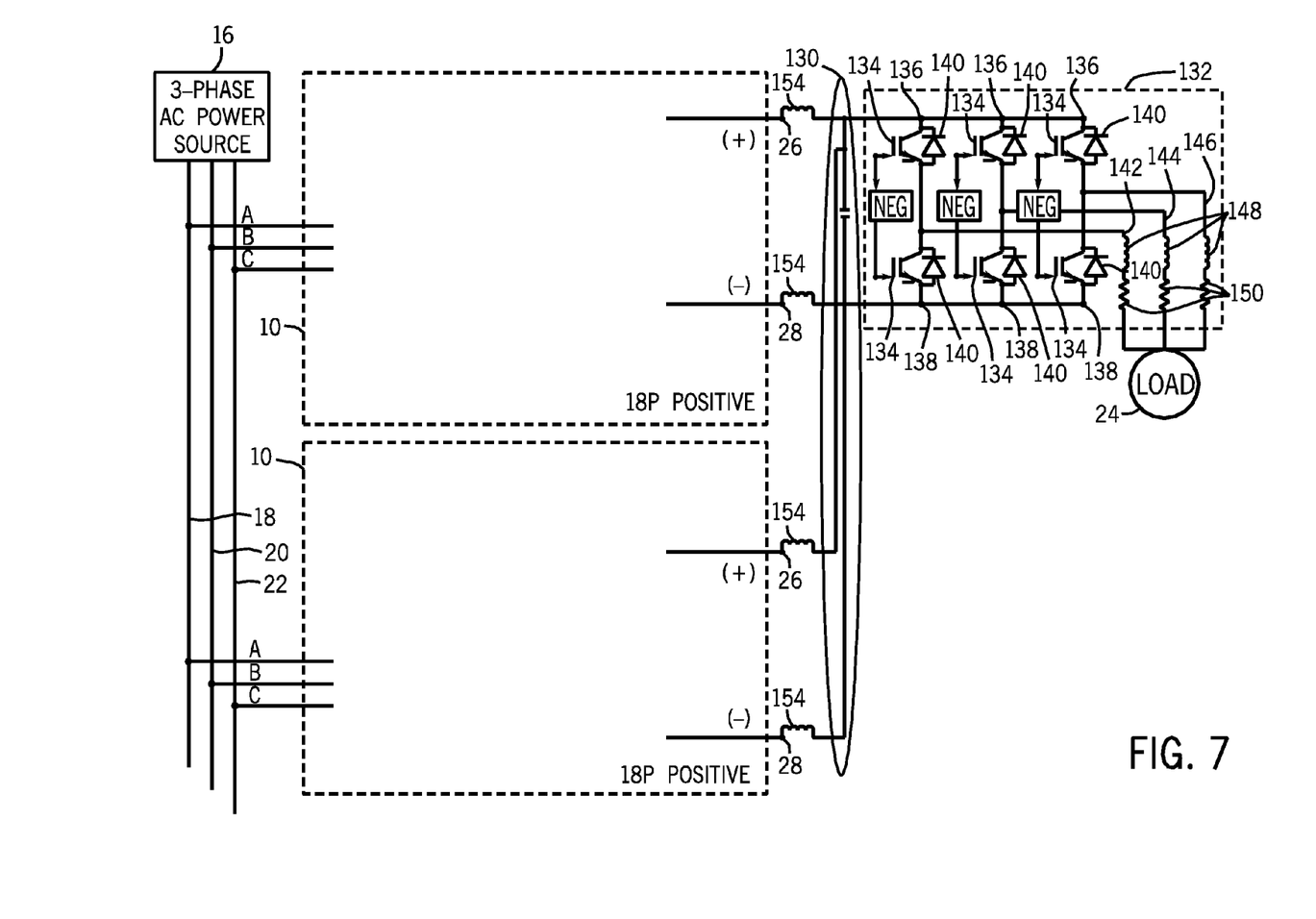
FIG. 7 is a schematic diagram of two exemplary embodiments of the 18-pulse positive building block of FIG. 1 in parallel with each other, having choke inductors coupled between each of the outputs downstream of the parallel building blocks and the DC bus.

Although illustrated in FIG. 6 as being used downstream of the 18-pulse positive building block 10 and the 18-pulse negative building block 114 in parallel, as with the AC line reactors 152, the choke inductors 154 may also prove useful in other configurations. For example, FIG. 7 is a schematic diagram of two exemplary embodiments of the 18-pulse positive building block 10 of FIG. 1 in parallel with each other, having choke inductors 154 coupled between each of the outputs 26, 28 downstream of the parallel building blocks 10. More specifically, as illustrated in FIG. 7, both of the 18-pulse positive building blocks 10 are associated with choke inductors 154 corresponding to each of the output lines 26, 28 which are connected to the DC bus 130. In the same manner as described above with respect to FIG. 6, the choke inductors 154 may help reduce the possibility of looping and current sharing between the two 18-pulse positive building blocks 10. In other embodiments, two 18-pulse negative building blocks 114 may also be used together in parallel, having choke inductors 154 coupled between each of the outputs 26, 28 downstream of the parallel building blocks 114. Furthermore, in certain embodiments, more than two of either the 18-pulse positive building blocks 10 or the 18-pulse negative building blocks 114 may be used in parallel. Indeed, as with the AC line reactors 152, different numbers and combinations of the 18-pulse positive building blocks 10 and the 18-pulse negative building blocks 114 may be used together in parallel. In all of these embodiments, the choke inductors 154 may help reduce the possibility of looping and current sharing between the parallel building blocks 10, 114. In addition, the choke inductors 154 may be used in other locations downstream of the parallel building blocks 10, 114 in order to help reduce the possibility of looping and current sharing. For example, in certain embodiments, the choke inductors 154 may be coupled to the DC bus 130 downstream of the DC bus 130 and upstream of the inverter circuit 132.

As described above, multiple different combinations of parallel building blocks 10, 114 may be used together to reduce AC line current harmonics and DC ripple while also reducing the possibility of looping and current sharing between the parallel building blocks 10, 114. As described briefly above, one particular configuration which may prove beneficial is the use of multiple instances of the 18-pulse positive building block 10 and 18-pulse negative building block 114 pair in parallel. For simplicity, the combination of the 18-pulse positive building block 10 and the 18-pulse negative building block 114 in parallel with each other may be referred to as a 36-pulse positive/negative building block 156.

Figure 8:
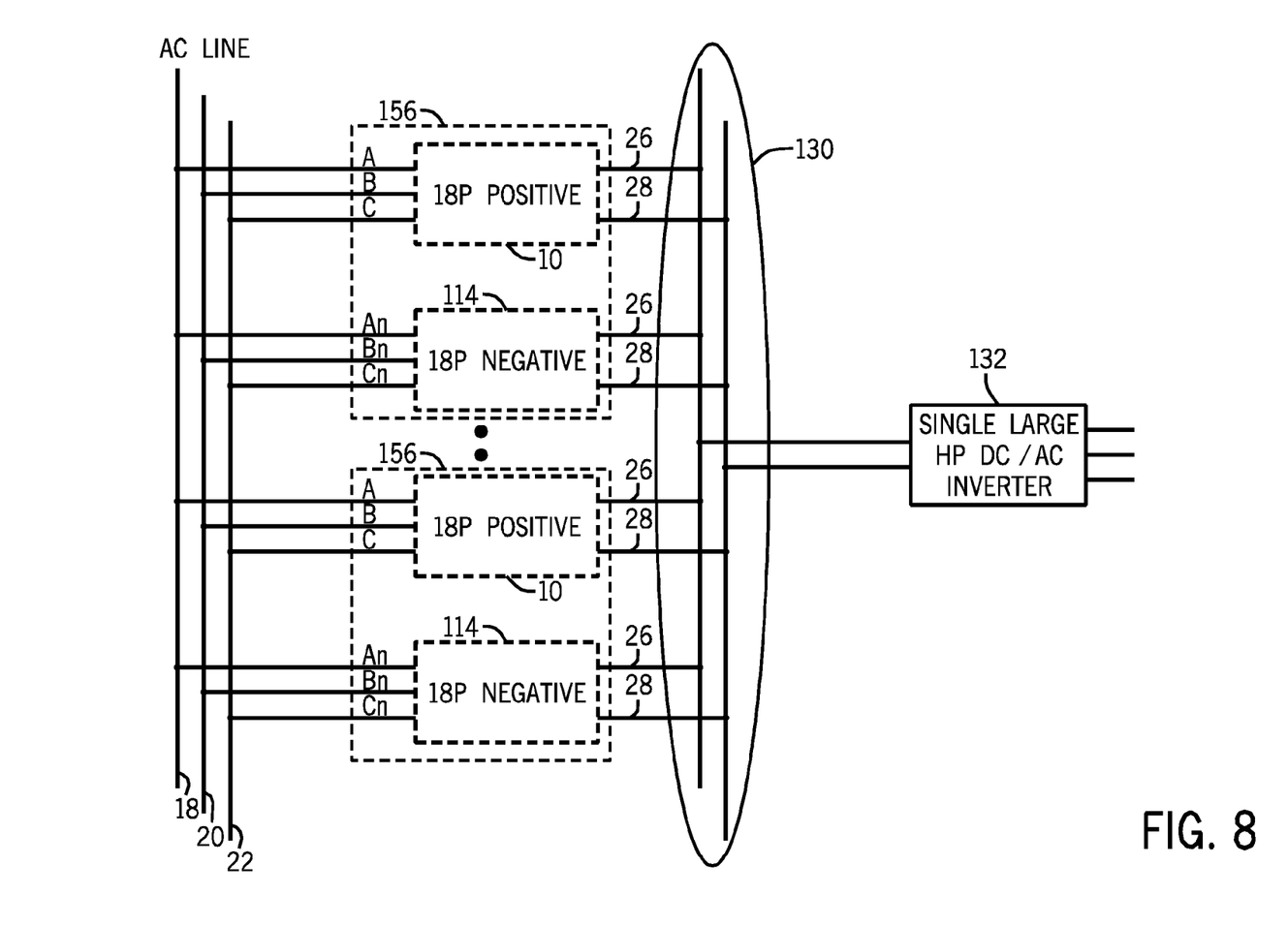
FIG. 8 is a schematic diagram of multiple exemplary embodiments of a 36-pulse positive/negative building block in parallel, wherein each 36-pulse positive/negative building block includes an 18-pulse positive building block and an 18-pulse negative building block in parallel with each other.

FIG. 8 is a schematic diagram of multiple exemplary embodiments of the 36-pulse positive/negative building block 156 in parallel, wherein each 36-pulse positive/negative building block 156 includes an 18-pulse positive building block 10 and an 18-pulse negative building block 114 in parallel with each other. As described above, the 36-pulse positive/negative building block 156 may increase the overall power rating of the drive while also helping reduce AC line current harmonics and DC ripple. By connecting multiple 36-pulse positive/negative building blocks 156 in parallel with each other, the overall power rating of the drive may further be increased while still reducing AC line current harmonics and DC ripple. As illustrated, in certain embodiments, as described above, a single DC/AC inverter circuit 132 may be used downstream of the DC bus 130. However, due to the increased power rating generated by the multiple 36-pulse positive/negative building blocks 156 in parallel, the inverter circuit 132 may be sized significantly larger than the inverter circuits 132 described above with respect to FIGS. 3 through 7.

In addition, in certain embodiments, the multiple 36-pulse positive/negative building blocks 156 of FIG. 8 may be used with the AC line reactors 152 or the choke inductors 154 described above. In general, the use of the AC line reactors 152 and the choke inductors 154 may be similar to that described above with respect to FIGS. 4 through 7. For example, the AC line reactors 152 may be coupled to each of the input lines 18, 20, and 22 upstream of the multiple parallel 36-pulse positive/negative building blocks 156. Similarly, the choke inductors 154 may be coupled between each of the outputs 26, 28 of the multiple parallel 36-pulse positive/negative building blocks 156 and the DC bus 130. As described above, using either the AC line reactors 152 or the choke inductors 154 in conjunction with the multiple parallel 36-pulse positive/negative building blocks 156 may allow for increased overall power rating of the drive, reduced AC line current harmonics and DC ripple, and reduced looping and current sharing between the multiple parallel 36-pulse positive/negative building blocks 156.

Figure 9:
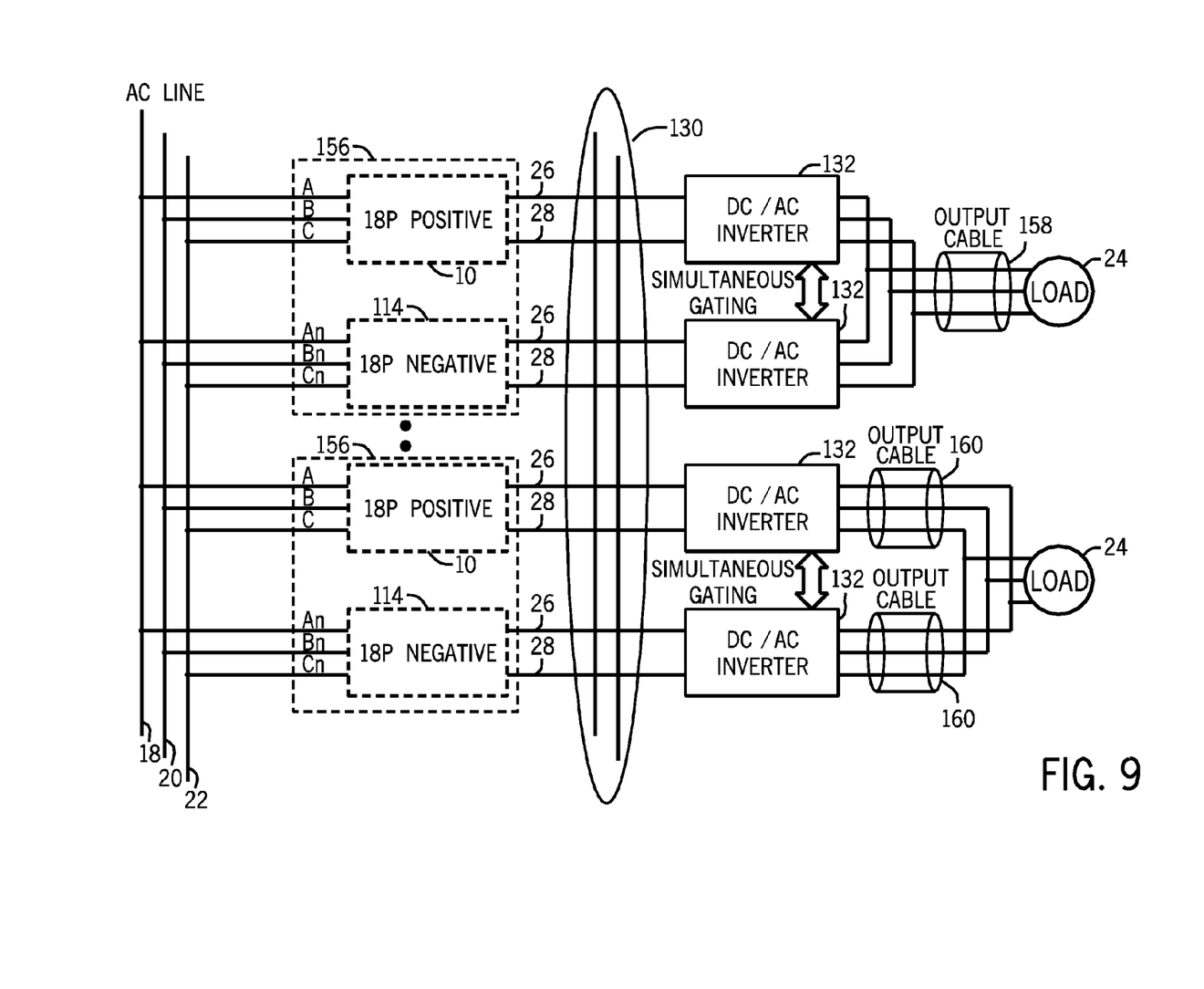
FIG. 9 is a schematic diagram of multiple exemplary embodiments of the 36-pulse positive/negative building block in parallel with each other, having multiple DC/AC inverter circuits connected downstream from the DC bus.

As described above, a single DC/AC inverter circuit 132 may be used downstream of the DC bus 130 from multiple, parallel 36-pulse positive/negative building blocks 156. However, this is not the only configuration of DC buses 130 and inverter circuits 132 that may be used downstream of multiple, parallel 36-pulse positive/negative building blocks 156. For example, FIG. 9 is a schematic diagram of multiple exemplary embodiments of the 36-pulse positive/negative building block 156 in parallel with each other, having multiple DC/AC inverter circuits 132 connected downstream from a DC bus 130. In the illustrated embodiment, each of the individual building blocks 10, 114 (e.g., the 18-pulse positive building blocks 10 and the 18-pulse negative building blocks 114) are connected to a respective DC/AC inverter circuit 132 through the DC bus 130. As may be appreciated, by providing individual inverter circuits 132 for each building block 10, 114, the inverter circuits 132 may be sized significantly smaller than the single DC/AC inverter circuit 132 illustrated in FIG. 8. In this embodiment, as illustrated, it may prove beneficial to enable simultaneous gating between pairs of inverter circuits 132 which relate to a respective 36-pulse positive/negative building block 156. Doing so may provide further protection against the possibility of looping and current sharing between the parallel building blocks 10, 114.

The connections downstream of the inverter circuits 132 illustrated in FIG. 9 may also vary. For example, in general, for each pair of inverter circuits 132 relating to a respective 36-pulse positive/negative building block 156, the pair of inverter circuits 132 may be connected together to a load 24. However, the specific connections between the pair of inverters circuits 132 and the load 24 may vary. As illustrated in FIG. 9, in certain situations, the pair of inverter circuits 132 may be coupled together within a single output cable 158. In other words, the output terminals 142, 144, 146 of the inverter circuits 132 may be coupled to one another at an end of the output cable 158 proximate to the inverter circuits 132. Alternatively, each individual inverter circuit 132 may be associated with its own output cable 160. In other words, the output terminals 142, 144, 146 of the inverter circuits 132 may be coupled to one another at an end of the output cable 158 proximate to the load 24. As illustrated, single or multiple output cables 158, 160 associated with pairs of inverter circuits 132 may, in fact, be used in a common drive.

In addition, as in FIG. 8 discussed above, in certain embodiments, the multiple 36-pulse positive/negative building blocks 156 of FIG. 9 may be used with the AC line reactors 152 or the choke inductors 154 described above. In general, the use of the AC line reactors 152 and the choke inductors 154 may be similar to that described above with respect to FIGS. 4 through 8. For example, the AC line reactors 152 may again be coupled to each of the input lines 18, 20, and 22 upstream of the multiple parallel 36-pulse positive/negative building blocks 156. Similarly, the choke inductors 154 may be coupled between each of the outputs 26, 28 of the multiple parallel 36-pulse positive/negative building blocks 156 and the DC bus 130. However, in the embodiment illustrated in FIG. 9, the choke inductors 154 may be used either upstream of downstream of the DC bus 130. However, in general, each pair of choke inductors 154 associated with a respective 36-pulse positive/negative building block 156 may be used in similar locations (e.g., both upstream of the DC bus 130 or both downstream of the DC bus 130). As described above, using either the AC line reactors 152 or the choke inductors 154 in conjunction with the multiple parallel 36-pulse positive/negative building blocks 156 may allow for increased overall power rating of the drive, reduced AC line current harmonics and DC ripple, and reduced looping and current sharing between the multiple parallel 36-pulse positive/negative building blocks 156. In addition, as discussed above, using multiple DC/AC inverter circuits 132 instead of a single, large DC/AC inverter circuit 132 (e.g. in FIG. 8) may enable each individual inverter circuit 132 to be sized smaller.

In yet other embodiments, individual DC/AC inverter circuits 132 may be used with respective 36-pulse positive/negative building blocks 156. For example, FIG. 10 is a schematic diagram of multiple exemplary embodiments of the 36-pulse positive/negative building block 156 in parallel with each other, having multiple DC/AC inverter circuits 132 connected downstream from a DC bus 130 and each DC/AC inverter circuit 132 associated with a respective 36-pulse positive/negative building block 156.

In the illustrated embodiment, each of the individual 36-pulse positive/negative building blocks 156 is connected to a respective DC/AC inverter circuit 132 through the DC bus 130. Again, by providing individual inverter circuits 132 for each 36-pulse positive/negative building block 156, the inverter circuits 132 may be sized significantly smaller than the single DC/AC inverter circuit 132 illustrated in FIG. 8. However, in the embodiment illustrated in FIG. 10, the inverter circuits 132 may, in general, be somewhat larger than the inverter circuits 132 illustrated in FIG. 9. However, providing common inverter circuits 132 for each 36-pulse positive/negative building block 156 may provide further protection against the possibility of looping and current sharing between the parallel 36-pulse positive/negative building blocks 156.

Figure 10:
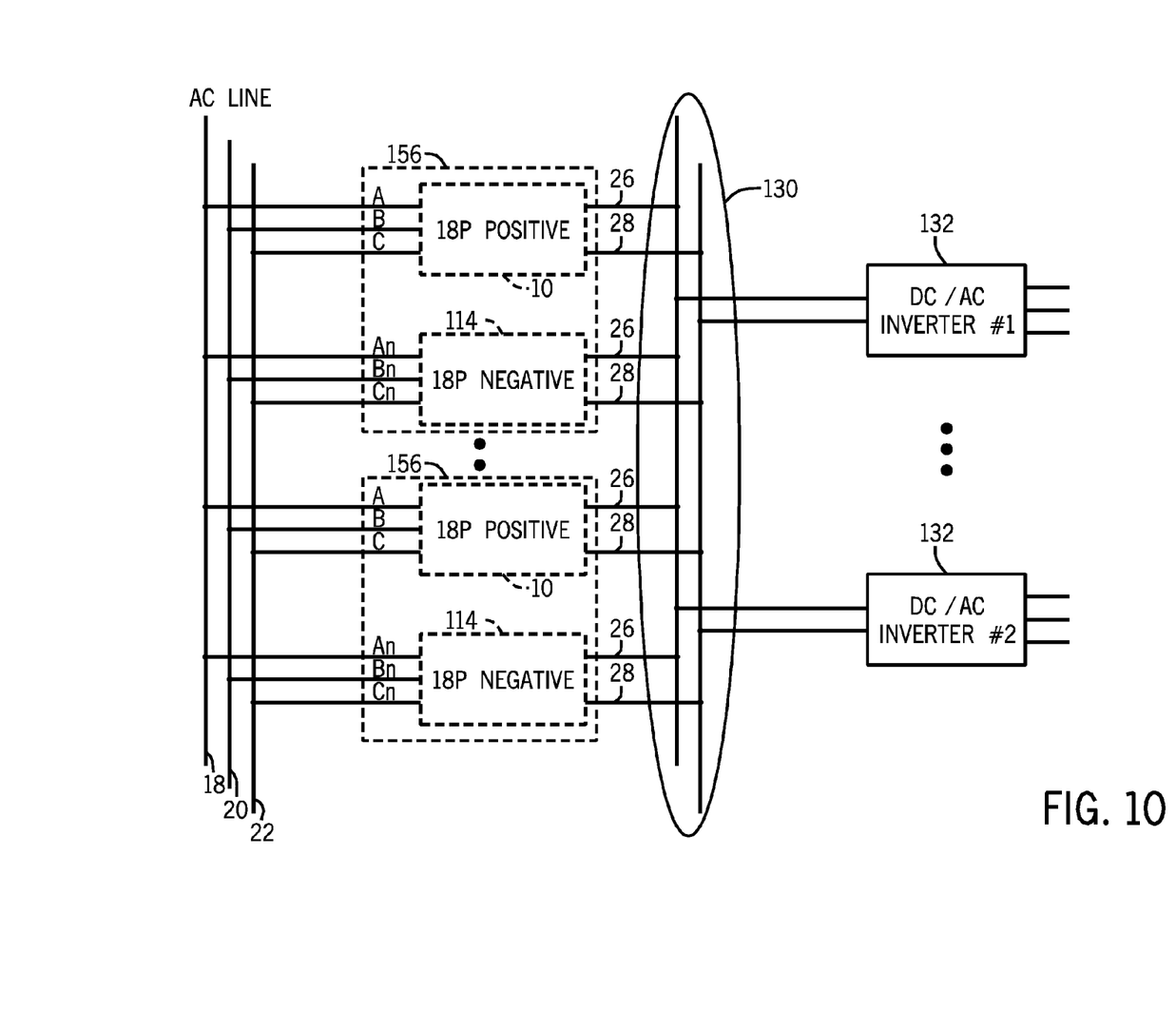
FIG. 10 is a schematic diagram of multiple exemplary embodiments of the 36-pulse positive/negative building block in parallel with each other, having multiple DC/AC inverter circuits connected downstream from the DC bus and each DC/AC inverter circuit associated with a respective 36-pulse positive/negative building block.

In addition, as in FIGS. 8 and 9 discussed above, in certain embodiments, the multiple 36-pulse positive/negative building blocks 156 of FIG. 10 may be used with the AC line reactors 152 or the choke inductors 154 described above, or with both the AC line reactors 152 and the choke inductors 154. In general, the use of the AC line reactors 152 and the choke inductors 154 may be similar to that described above with respect to FIGS. 4 through 9. For example, the AC line reactors 152 may again be coupled to each of the input lines 18, 20, and 22 upstream of the multiple parallel 36-pulse positive/negative building blocks 156. Similarly, the choke inductors 154 may be coupled between each of the outputs 26, 28 of the multiple parallel 36-pulse positive/negative building blocks 156 and the DC bus 130. As described above, using either the AC line reactors 152 or the choke inductors 154 in conjunction with the multiple parallel 36-pulse positive/negative building blocks 156 may allow for increased overall power rating of the drive, reduced AC line current harmonics and DC ripple, and reduced looping and current sharing between the multiple parallel 36-pulse positive/negative building blocks 156. In addition, as discussed above, using multiple DC/AC inverter circuits 132 instead of a single, large DC/AC inverter circuit 132 (e.g. in FIG. 8) may enable each individual inverter circuit 132 to be sized smaller. However, as discussed above, using a common DC/AC inverter circuit 132 for each respective 36-pulse positive/negative building block 156 may further reduce the possibility of looping and current sharing between the parallel 36-pulse positive/negative building blocks 156.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power circuit, comprising:
a first rectifier circuit comprising:
a first transformer having 15 inductors coupled in series, the inductors joined by 15 nodes interposed between pairs of the inductors, wherein the inductors from the first transformer form a first hexagon, the first hexagon having first, second, third, fourth, fifth, and sixth vertices and alternating sides comprising 2 and 3 inductors, respectively, wherein the first vertex opposes the second vertex, the third vertex opposes the fourth vertex, and the fifth vertex opposes the sixth vertex; and
a first set of nine outputs for nine-phase AC power, wherein each output of the first set is coupled to a respective node of the first hexagon that is not a vertex of the first hexagon and coupled to a first diode bridge;
a second rectifier circuit coupled in parallel with the first rectifier circuit, wherein the second rectifier circuit comprises:
a second transformer having 15 inductors coupled in series, the inductors joined by 15 nodes interposed between pairs of the inductors, wherein the inductors of the second transformer form a second hexagon, the second hexagon having first, second, third, fourth, fifth, and sixth vertices located in the same relative positions as the vertices of the first hexagon and having alternating sides comprising 2 and 3 inductors, respectively; and
a second set of nine outputs for nine-phase AC power, wherein each output of the second set is coupled to a respective node of the second hexagon that is not a vertex of the second hexagon and coupled to a second diode bridge;
a first, second, and third AC input configured to couple to a first, second, and third phase output of an AC power source, respectively, wherein the first input is configured to couple to the first vertex of the first hexagon and to the second vertex of the second hexagon, wherein the second input is configured to couple to the third vertex of the first hexagon and to the fourth vertex of the second hexagon, and wherein the third input is configured to couple to the fifth vertex of the first hexagon and to the sixth vertex of the second hexagon; and
a DC bus coupled to outputs of the first and second diode bridges of the first and second rectifier circuits.

2. The power circuit of claim 1, comprising AC line reactors coupled to each input of each of the rectifier circuits.

3. The power circuit of claim 2, wherein the AC line reactors are configured to reduce circulating current between the first and second rectifier circuits and promote load sharing between the first and second rectifier circuits.

4. The power circuit of claim 2, wherein the AC line reactors have a cumulative impedance value of between 1.5% and 15% of the total impedance of the power circuit.

5. The power circuit of claim, comprising an inductor coupled between each output of the first diode bridge and the second diode bridge and the DC bus.

6. The power circuit of claim 5, wherein the inductor is configured to reduce circulating current between the rectifier circuits and promote load sharing between the first and second rectifier circuits.

7. The power circuit of claim 1, wherein all of the inductors of the first and second rectifier circuits are generally identical.

8. The power circuit of claim 1, comprising third and fourth rectifier circuits substantially identical to the first and second rectifier circuits, respectively, and coupled in parallel with the first and second rectifier circuits.

9. The power circuit of claim 1, further comprising an inverter circuit coupled to the DC bus and configured to convert DC power from the DC bus to controllable frequency output power.

10. The power circuit of claim 9, comprising a plurality of inverter circuits coupled to the DC bus and configured to convert DC power from the DC bus to controllable frequency output power, three-phase output conductors of the inverter circuits being coupled to one another to place the inverter circuits electrically in parallel.

11. The circuit of claim 10, wherein the three-phase output conductors include cables extending from the inverter circuits, the conductors being coupled to one another at an end of the cables proximate to a load.

12. A power circuit, comprising:
a first rectifier circuit comprising:
a first transformer having 15 inductors coupled in series, the inductors joined by 15 nodes interposed between pairs of the inductors, wherein the inductors of the first transformer form a first hexagon, the first hexagon having first, second, third, fourth, fifth, and sixth vertices and alternating sides comprising 2 and 3 inductors, respectively, and wherein the first vertex opposes the second vertex, the third vertex opposes the fourth vertex, and the fifth vertex opposes the sixth vertex; and
a first set of nine outputs for nine-phase AC power, wherein each output of the first set is coupled to a respective node of the first hexagon that is not a vertex of the first hexagon and a first diode bridge;
a second rectifier circuit coupled in parallel with the first rectifier circuit, wherein the second rectifier circuit comprises:
a second transformer having 15 inductors coupled in series, the inductors joined by 15 nodes interposed between pairs of the inductors, wherein the inductors of the second transformer form a second hexagon, the second hexagon having first, second, third, fourth, fifth, and sixth vertices located in the same relative positions as the vertices of the first hexagon and having alternating sides comprising 2 and 3 inductors, respectively; and
a second set of nine outputs for nine-phase AC power, wherein each output of the second set is coupled to a respective node of the second hexagon that is not a vertex of the second hexagon and coupled to a second diode bridge;
a first, second, and third AC input configured to couple to a first, second, and third phase output of an AC power source, respectively, wherein the first input is configured to couple to the first vertex of the first hexagon and to the second vertex of the second hexagon, wherein the second input is configured to couple to the third vertex of the first hexagon and to the fourth vertex of the second hexagon, and wherein the third input is configured to couple to the fifth vertex of the first hexagon and to the sixth vertex of the second hexagon;
a DC bus coupled to outputs of the first and second diode bridges of the first and second rectifier circuits; and
a plurality of inverter circuits coupled to the DC bus and configured to convert DC power from the DC bus to controllable frequency output power.

13. The power circuit of claim 12, comprising AC line reactors coupled to each input of each of the rectifier circuits, inductors coupled to each output of the first diode bridge and the second diode bridge, or a combination thereof.

14. The power circuit of claim 13, wherein the AC line reactors, the inductors coupled to each output of the first diode bridge and the second diode bridge, or a combination thereof is configured to reduce circulating current between the first and second rectifier circuits and promote load sharing between the first and second rectifier circuits.

15. The power circuit of claim 12, comprising a plurality of inverter circuits coupled to the DC bus and configured to convert DC power from the DC bus to controllable frequency output power, three-phase output conductors of the inverter circuits being coupled to one another to place the inverter circuits electrically in parallel.

16. The circuit of claim 15, wherein the three-phase output conductors include cables extending from the inverter circuits, the conductors being coupled to one another at an end of the cables proximate to a load.

17. The power circuit of claim 15, wherein the three-phase output conductors include cables extending from the inverter circuits, the conductors being coupled to one another at an end of the cables proximate to a load.

18. The power circuit of claim 12, wherein all of the inductors of the first and second rectifier circuits are generally identical.

19. The power circuit of claim 12, comprising third and fourth rectifier circuits substantially identical to the first and second rectifier circuits, respectively, and coupled in parallel with the first and second rectifier circuits.

20. A power circuit, comprising:
a first rectifier circuit comprising:
a first transformer having 15 inductors coupled in series, the inductors joined by 15 nodes interposed between pairs of the inductors, wherein the inductors from the first transformer form a first hexagon, the first hexagon having first, second, third, fourth, fifth, and sixth vertices and alternating sides comprising 2 and 3 inductors, respectively, wherein all of the inductors are generally identical, and wherein the first vertex opposes the second vertex, the third vertex opposes the fourth vertex, and the fifth vertex opposes the sixth vertex; and
a first set of nine outputs for nine-phase AC power, wherein each output of the first set is coupled to a respective node of the first hexagon that is not a vertex of the first hexagon and a first diode bridge,
a second rectifier circuit coupled in parallel with the first rectifier circuit, wherein the second rectifier circuit comprises:
a second transformer having 15 inductors coupled in series, the inductors joined by 15 nodes interposed between pairs of the inductors, wherein the inductors from the second transformer form a second hexagon, the second hexagon having first, second, third, fourth, fifth, and sixth vertices located in the same relative positions as the vertices of the first hexagon and having alternating sides comprising 2 and 3 inductors, respectively; and
a second set of nine outputs for nine-phase AC power, wherein each output of the second set is coupled to a respective node of the second hexagon that is not a vertex of the second hexagon and coupled to a second diode bridge;
a first, second, and third AC input configured to couple to a first, second, and third phase output of an AC power source, respectively, wherein the first input is configured to couple to the first vertex of the first hexagon and to the second vertex of the second hexagon, wherein the second input is configured to couple to the third vertex of the first hexagon and to the fourth vertex of the second hexagon, and wherein the third input is configured to couple to the fifth vertex of the first hexagon and to the sixth vertex of the second hexagon;

a DC bus coupled to outputs of the diode bridges of the first and second rectifier circuits;

AC line reactors coupled to each input of each of the rectifier circuits, wherein the AC line reactors are configured to reduce circulating current between the first and second rectifier circuits and promote load sharing between the first and second rectifier circuits; and an inverter circuit coupled to the DC bus and configured to convert DC power from the DC bus to controllable frequency output power.

* * * * *